United States Patent
Cho

(10) Patent No.: US 11,200,315 B2
(45) Date of Patent: Dec. 14, 2021

(54) ARTIFICIAL INTELLIGENCE BASED MALWARE DETECTION SYSTEM AND METHOD

(71) Applicant: CTILAB CO., LTD., Seoul (KR)

(72) Inventor: Hong Yeon Cho, Suwon-si (KR)

(73) Assignee: CTILAB CO., LTD., Seoul (KR)

( * ) Notice: Subject to any disclaimer, the term of this patent is extended or adjusted under 35 U.S.C. 154(b) by 162 days.

(21) Appl. No.: 16/626,193

(22) PCT Filed: Jun. 25, 2018

(86) PCT No.: PCT/KR2018/007161
§ 371 (c)(1),
(2) Date: Dec. 23, 2019

(87) PCT Pub. No.: WO2019/004671
PCT Pub. Date: Jan. 3, 2019

(65) Prior Publication Data
US 2020/0218806 A1    Jul. 9, 2020

(30) Foreign Application Priority Data

Jun. 30, 2017  (KR) ................. 10-2017-0083779

(51) Int. Cl.
G06F 21/56     (2013.01)
G06K 9/32      (2006.01)
G06K 9/62      (2006.01)
G06N 3/04      (2006.01)
G06N 3/08      (2006.01)

(52) U.S. Cl.
CPC ......... *G06F 21/562* (2013.01); *G06K 9/3233* (2013.01); *G06K 9/6247* (2013.01);
(Continued)

(58) Field of Classification Search
CPC .... G06F 21/562; G06F 21/564; G06F 16/258; G06F 21/56; G06K 9/3233;
(Continued)

(56) References Cited

U.S. PATENT DOCUMENTS 9,672,358 B1 *  6/2017  Long ................. G06F 21/565
9,690,938 B1 *  6/2017  Saxe .................. G06N 3/0454
(Continued)

FOREIGN PATENT DOCUMENTS

KR   10-2015-0103903 A    9/2015
KR   10-2016-0119678 A   10/2016

OTHER PUBLICATIONS

Kim, "Image-based Artificial Intelligence Deep Learning to Protect the Big Data from Malware", Journal of The Institute of Electronics and Information Engineers, Publication Date Feb. 2017, pp. 246-252, vol. 54, No. 2. English Machine translation. (Year: 2017).*

(Continued)

*Primary Examiner* — Juan A Torres
(74) *Attorney, Agent, or Firm* — Paratus Law Group, PLLC

(57) ABSTRACT

An AI-based malware detection method is provided. The method includes inputting malware binary data, extracting metadata from the inputted malware binary data, converting the extracted metadata into image data, and training a neural network on the converted image data to classify malware. Malware binary data can be effectively classified by converting the binary data to image data and analyzed through deep learning-based image models. In addition, results from the AI detection algorithm technology can be displayed visually for easy interpretation.

16 Claims, 9 Drawing Sheets

(52) U.S. Cl.
CPC ......... *G06K 9/6257* (2013.01); *G06N 3/0454* (2013.01); *G06N 3/08* (2013.01)

(58) Field of Classification Search
CPC ............ G06K 9/6257; G06K 9/00557; G06K 9/6271; G06N 3/0454; G06N 3/08; G06N 3/0445; G06N 3/0472; G06N 20/20; G06T 3/40; G06T 5/50; G06T 3/4046; G06T 2207/20084; G06T 2207/20081
USPC ........................................................ 382/159
See application file for complete search history.

(56) References Cited

U.S. PATENT DOCUMENTS

| | | | |
|---|---|---|---|
| 2011/0041179 A1* | 2/2011 | St hlberg .............. | G06F 21/566 726/23 |
| 2017/0017793 A1 | 1/2017 | Davis et al. | |
| 2017/0068816 A1 | 3/2017 | Cavazos | |
| 2018/0041536 A1* | 2/2018 | Berlin ..................... | G06F 21/56 |
| 2020/0193024 A1* | 6/2020 | Davis ..................... | G06N 5/022 |

OTHER PUBLICATIONS

International Search Report for PCT/KR2018/007161 dated Sep. 27, 2018 from Korean Intellectual Property Office.
Hae Jung Kim et al., "Image-based Artificial Intelligence Deep Learning to Protect the Big Data from Malware", Journal of The Institute of Electronics and Information Engineers, Feb. 2017, pp. 246-252, vol. 54, No. 2.

* cited by examiner

FIG. 2

| VARIOUS FEATURES WITH THEIR ANALYSIS TYPE ||
|---|---|
| Features | Analysis Type |
| Personal computing ||
| Strings | Static & Dynamic |
| DLL & API call | Static |
| Byte-n-grams | Static |
| Opcode-n-grams | Static |
| PE headers fieds | Static |
| Network and Host activities | Dynamic |
| Image properties | Static |
| Hardware features | Dynamic |
| Mobile Computing ||
| Permissions and Intents | Static |
| Strings | Static |
| System calls | Static & Dynamic |
| Image properties | Static |
| Network and Host activities | Dynamic |

ARTIFICIAL INTELLIGENCE BASED MALWARE DETECTION SYSTEM AND METHOD

CROSS REFERENCE TO PRIOR APPLICATIONS

This application is a National Stage Patent Application of PCT International Patent Application No. PCT/KR2018/007161 (filed on Jun. 25, 2018) under 35 U.S.C. § 371, which claims priority to Korean Patent Application No. 10-2017-0083779 (filed on Jun. 30, 2017), which are all hereby incorporated by reference in their entirety.

TECHNICAL FIELD

The present disclosure relates to malware detection system and method, and more particularly, to AI-based malware detection system and method, which convert malware binary data into image data by applying image technology and then apply deep learning-based image recognition on said image data for classification.

BACKGROUND

The most widely used malware detection method is signature analysis, but this method is limited to detecting malware that is known and classified in advance.

Attempts have been made to increase the detection rate of unknown malware by introducing machine learning technology. However, machine learning-based malware detection technology is still limited to drawing conclusions from correlations and patterns in accumulated data.

In addition to machine learning's ability to cluster and classify data, deep learning, which can solve problems by learning similarly to the human brain, has sparked increased interest in deep learning algorithms.

SUMMARY

Technical Problem

Accordingly, an object of the present disclosure is to provide a malware detection system and method, which convert malware binary data into image data by applying image technology and then apply deep learning-based image recognition on said image data for classification.

Technical Solution

In order to solve the technical problems mentioned above, an AI-based malware detection method according to the present disclosure may include inputting malware binary data, extracting metadata from the inputted malware binary data, converting the extracted metadata into image data, and training a neural network on the converted image data to classify malware.

The step of converting the extracted metadata into image data may include converting the extracted metadata into gray scale image data.

The step of converting the extracted metadata into image data may further include converting the extracted metadata into an audio file, and converting the converted audio file into spectrogram image data.

The method may further include adjusting the converted image data to a predetermined size.

Training a first neural network using the gray scale image data and training a second neural network using the spectrogram image data may be performed separately.

The method may further include generating augmented image data by performing data augmentation with respect to the converted image data.

The step of generating the augmented image data may include extracting a principal component feature in a malware feature space by applying Principal Component Analysis (PCA) with respect to the converted image data, calculating a principal component vector in the feature space with respect to the converted image data, generating a modified region of interest through noise jittering in the calculated principal component vector direction, and generating the augmented image data by merging the generated region of interest with a background image of the converted image data.

Neural networks may be trained to detect malware on said augmented image data.

The method may further include visualizing a feature of the malware binary data extracted through the trained neural network unit by applying a t-SNE algorithm.

The neural networks may be structured as Convolutional Neural Networks.

In order to solve the technical problems mentioned above, an AI-based malware detection system according to the present disclosure may include a metadata extraction unit that is inputted with malware binary data and that extracts metadata from the inputted malware binary data, a data converter that converts the extracted metadata into image data, and a neural network unit that receives the converted image data and learns the malware.

Advantageous Effects

According to the present disclosure, malware binary data can be effectively classified by converting said binary data to image data and analyzed through deep learning-based image models. In addition, results from said AI detection algorithm technology can be displayed visually for easy interpretation.

BRIEF DESCRIPTION OF THE DRAWINGS

FIG. 2 is a diagram provided to explain the malware metadata according to the present disclosure.

DETAILED DESCRIPTION

Hereinafter, preferred embodiments of the present disclosure will be described in detail with reference to the accompanying drawings so that those with ordinary knowledge in the art may easily achieve the present disclosure.

Figure 1:
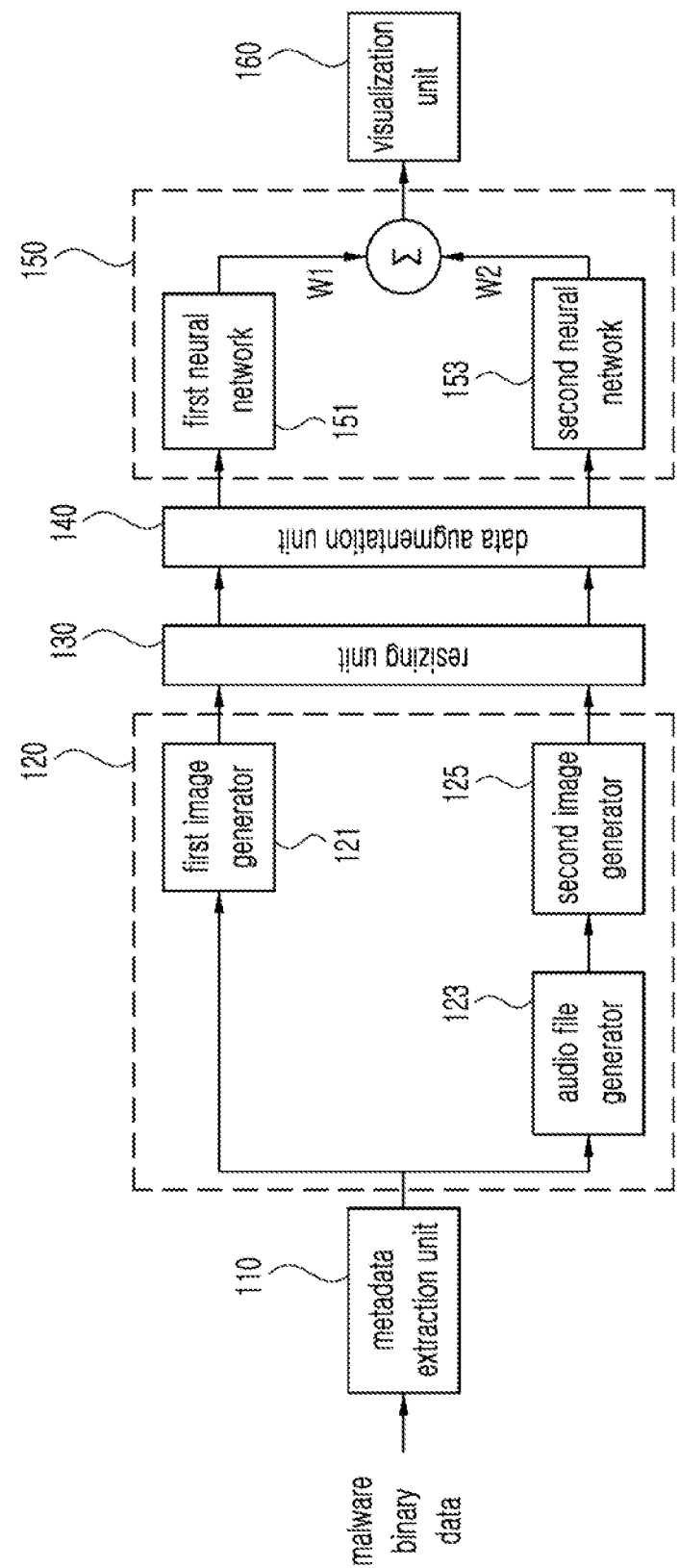
FIG. 1 is a block diagram showing a configuration of an AI-based malware detection system according to an embodiment of the present disclosure.

FIG. 1 is a block diagram showing a configuration of an AI-based malware detection system according to an embodiment of the present disclosure.

Referring to FIG. 1, the AI-based malware detection system according to the present disclosure includes a metadata extraction unit 110, a data converter 120, a resizing unit 130, a data augmentation unit 140, a neural network unit 150, and a visualization unit 160.

The metadata extraction unit 110 may receive malware binary data as training data and extract metadata. The extracted malware metadata may include those illustrated in FIG. 2.

FIG. 2 is a diagram provided to explain the malware metadata according to the present disclosure.

Referring to FIG. 2, in the case of personal computing, the malware metadata may be the strings, DLL & API call, byte-n-grams, Opcode-n-grams, PE headers fields, network and host activities, image properties, hardware features, and the like. In the case of mobile computing, the malware metadata may be the permissions and intents, strings, system calls, image properties, network and host activities, and the like.

The data converter 120 may convert the extracted metadata into image data.

The data converter 120 may include a first image generator 121, an audio file generator 123, and a second image generator 125.

The first image generator 121 may convert the extracted metadata into gray scale image data. For example, by processing the metadata by 8 bits, the brightness value of each pixel can be converted into a gray scale image representing 256 levels as illustrated in FIG. 3.

Figure 3:
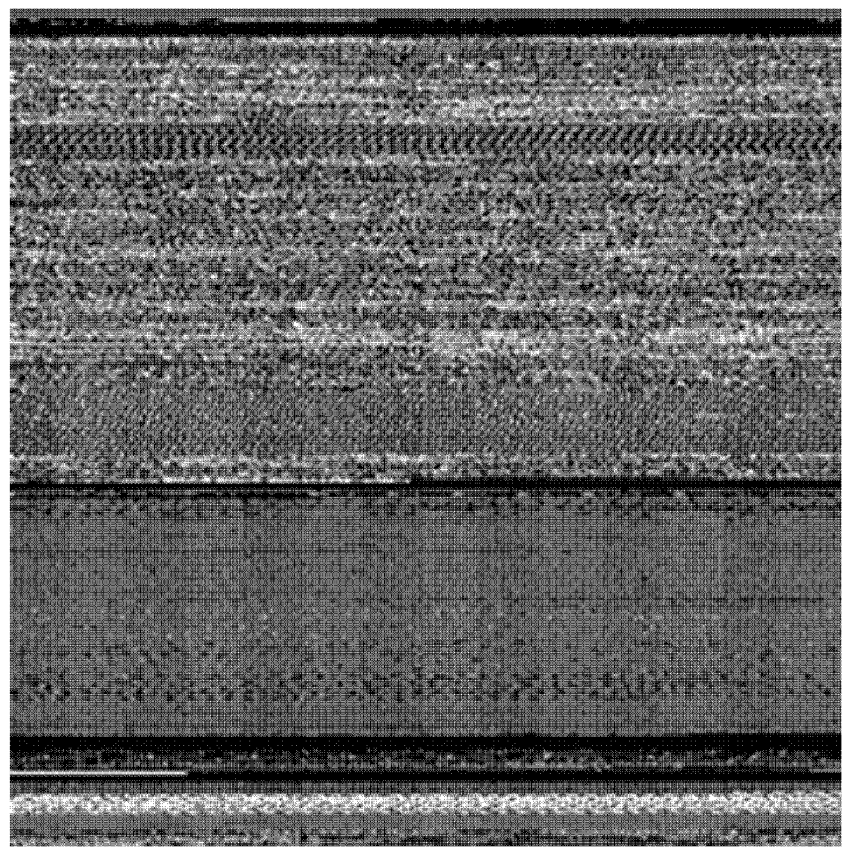
FIG. 3 illustrates an example of converting malware metadata into gray scale image data according to the present disclosure.

FIG. 3 illustrates an example of converting malware metadata into gray scale image data according to the present disclosure.

The audio file generator 123 may convert the extracted metadata into an audio file by attaching an audio header to the extracted metadata. Specifically, malware binary data, or metadata extracted therefrom may be handled in the same manner as non-compressed Pulse Code Modulation (PCM) audio data, so that it may be converted into an audio file by attaching a way audio header to the front thereof.

Figure 4:
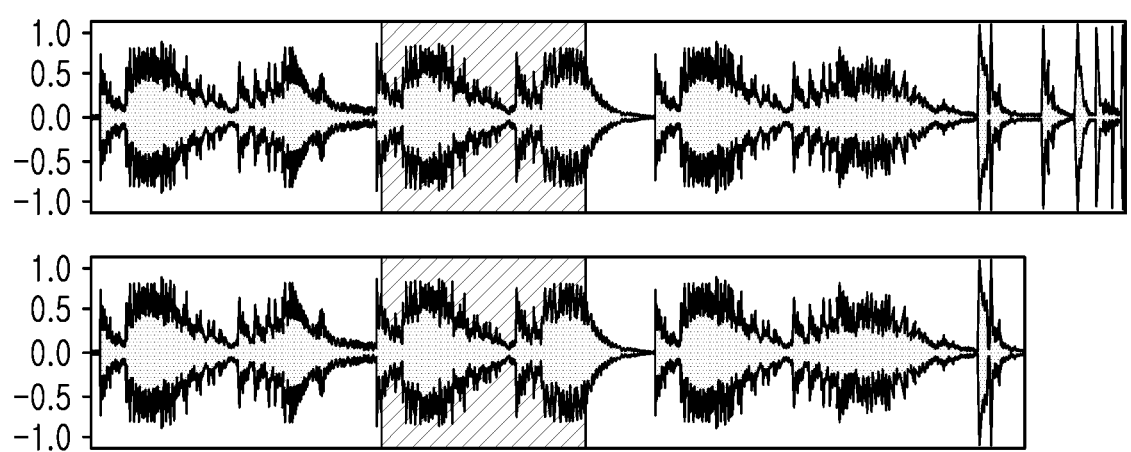
FIG. 4 is a diagram illustrating the waveform of an audio file obtained by converting malware metadata according to an embodiment of the present disclosure.

FIG. 4 is a diagram illustrating a waveform of an audio file obtained by converting malware metadata according to an embodiment of the present disclosure.

The second image generator 125 may convert the converted audio file into spectrogram image data. Spectrograms are image representations of the spectrum of sound waves. The converted audio file may be converted into a mel spectrogram image as illustrated in FIG. 5.

Figure 5:
FIG. 5 illustrates an example of converting an audio file derived from malware metadata into a spectrogram image according to the present disclosure.

FIG. 5 illustrates an example of converting an audio file converted from malware metadata into a spectrogram image according to the present disclosure.

Referring to FIG. 1 again, the resizing unit 130 may adjust the image data converted by the first image generating unit 121 and the second image generating unit 123 to a size suitable for training the neural network unit 150 (e.g., to a predetermined size such as 256*256 pixels). According to an embodiment, when the first image generating unit 121 or the second image generating unit 125 generates image data in the size suitable for training the neural network unit 150, the resizing unit 130 may not be necessary.

The data augmentation unit 140 may perform data augmentation with respect to the image data converted by the first image generator 121 and the second image generator 123. The data augmentation unit 140 may augment training pair data and validation pair data with respect to the image data. The data augmentation is used to increase the number of training data when there is little training image data available, by applying minute changes, such as, by image rotating, pixel shifting, or the like.

In particular, the data augmentation unit 140 according to the present disclosure may extract a principal component feature in a malware feature space by applying Principal Component Analysis (PCA) on the converted image data. In addition, the data augmentation unit 140 may calculate a principal component vector in the converted image feature space and generate a modified region of interest through noise jittering in the calculated principal component vector direction. Next, the data augmentation unit 140 may generate augmented image data by merging the generated region of interest with a background image of the converted image data.

The neural network unit 150 may receive image data augmented by the data augmentation unit 140 to learn malware. To this end, the neural network unit 150 may perform image-based malware learning, using inception module-based Convolutional Neural Networks (CNN) having excellent performance in image recognition. Of course, in addition to CNN, neural network algorithms applying various deep learning techniques, such as Deep Neural Networks (DNN), Recurrent Neural Network (RNN), restricted Boltzmann machine, Deep Belief Network (DBN), Deep Q-Network, and the like, may be utilized.

The neural network unit 150 may include a first neural network 151 and a second neural network 153. In this example, the first neural network 151 may learn malware using gray scale image data. The second neural network 153 may learn on malware data using spectrogram image data.

The neural network unit 150 may train the first neural network unit 151 and the second neural network 153 individually, and after the individual training is completed, may apply weights W_1 and W_2 to the outputs of the first neural network 151 and the second neural network 153 respectively to calculate the final output.

The visualization unit 160 may calculate and visualize two-dimensional and three-dimensional t-SNE plots by using a t-SNE algorithm, on the features of malware binary data extracted through the trained neural network unit.

Figure 6:
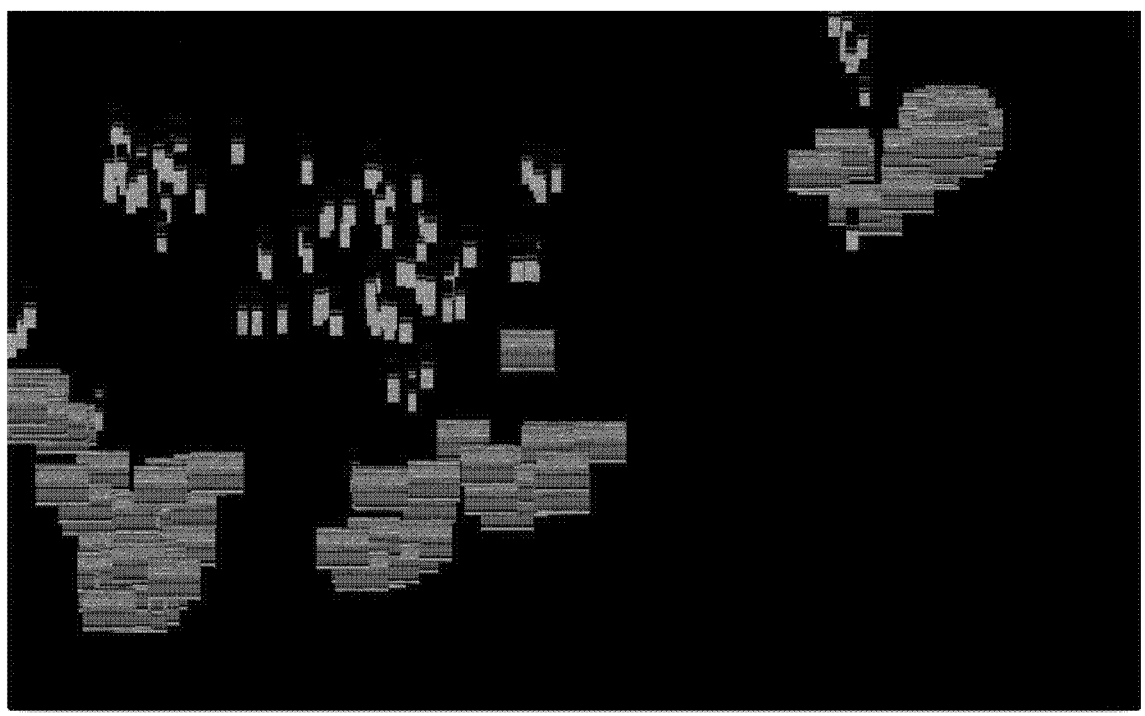
FIG. 6 illustrates a two-dimensional t-SNE plot calculated using the malware image data according to the present disclosure.
Figure 7:
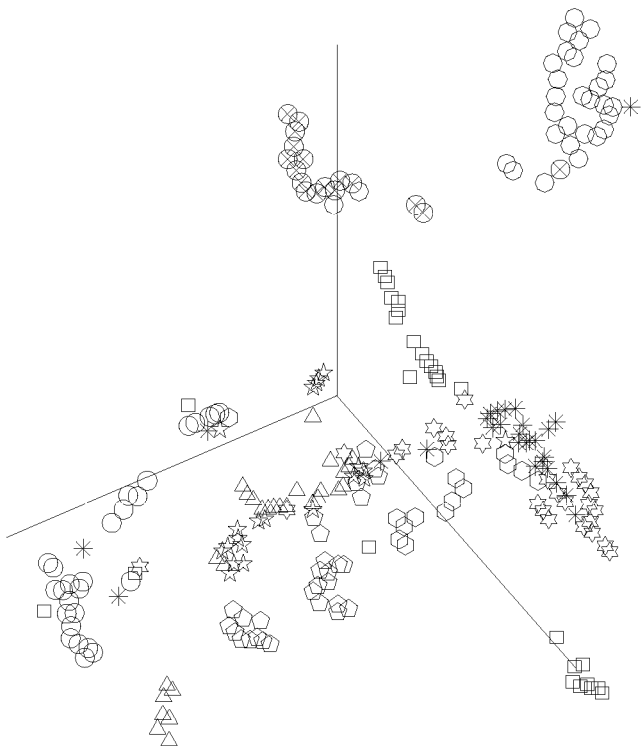
FIG. 7 illustrates a three-dimensional t-SNE plot calculated using malware image data.

FIG. 6 illustrates a two-dimensional t-SNE plot calculated using the malware image data according to the present disclosure. FIG. 7 illustrates a three-dimensional t-SNE plot calculated using malware image data.

In addition, rather than using gray scale image data converted from the malware binary data, it may be more effective to extract features from the spectrogram image data and visualize the features on t-SNE plots.

Figure 8:
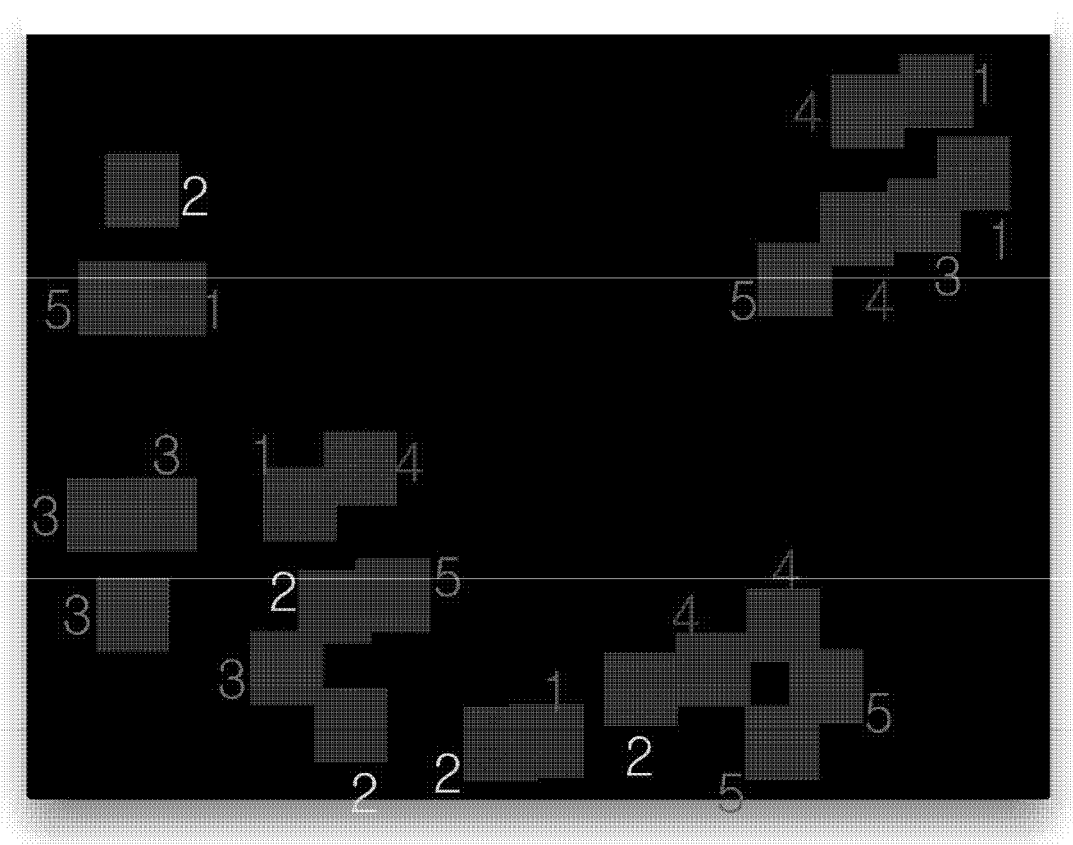
FIG. 8 illustrates a two-dimensional t-SNE plot calculated using malware gray scale image data according to the present disclosure.
Figure 9:
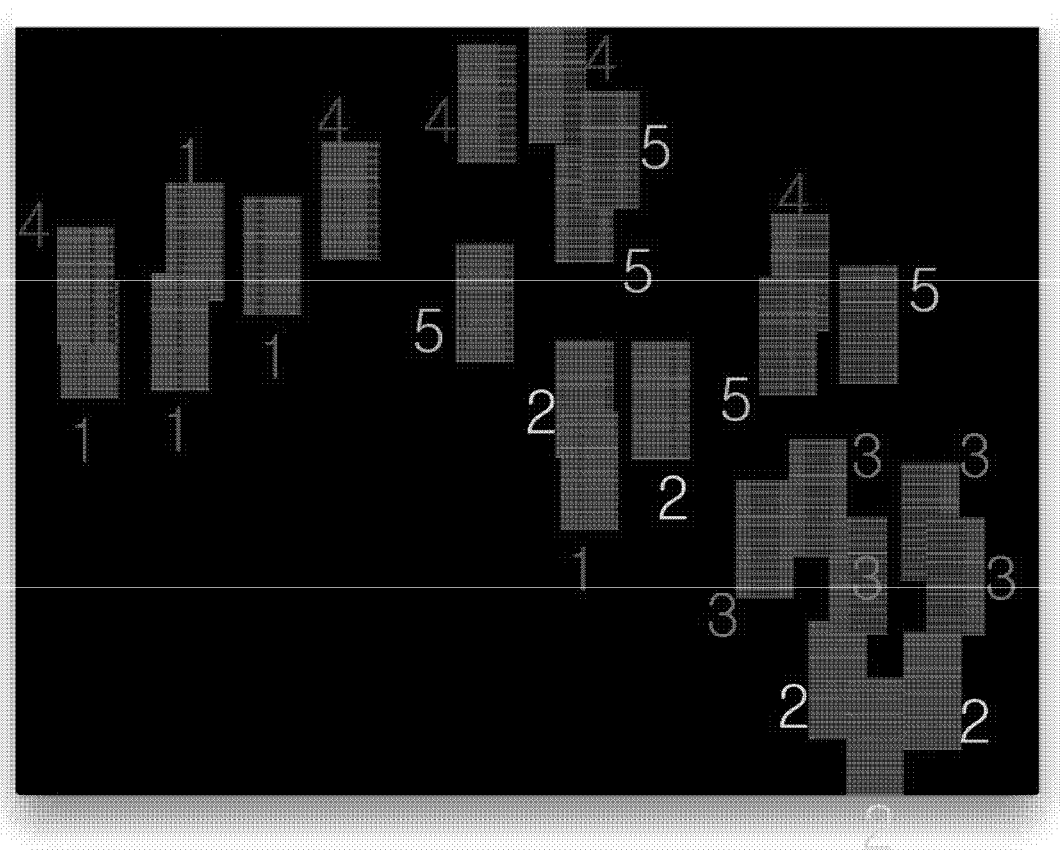
FIG. 9 illustrates a two-dimensional t-SNE plot calculated using malware spectrogram image data.

FIG. 8 illustrates a two-dimensional t-SNE plot calculated using malware gray scale image data according to the present disclosure, and FIG. 9 illustrates a two-dimensional t-SNE plot calculated using malware spectrogram image data.

The t-SNE plots shown in FIGS. 8 and 9 were visualized by extracting two features from image data converted from the malware binary data. Of course, three-dimensional t-SNE plot may be visualized by extracting three features. In FIGS. 8 and 9, identical numbers indicate identical classes.

The inter-class distance has to be far, while the intra-class distance has to be close, and it can be seen that results from malware spectrogram image data show better class separation than results from grayscale image data.

Figure 10:
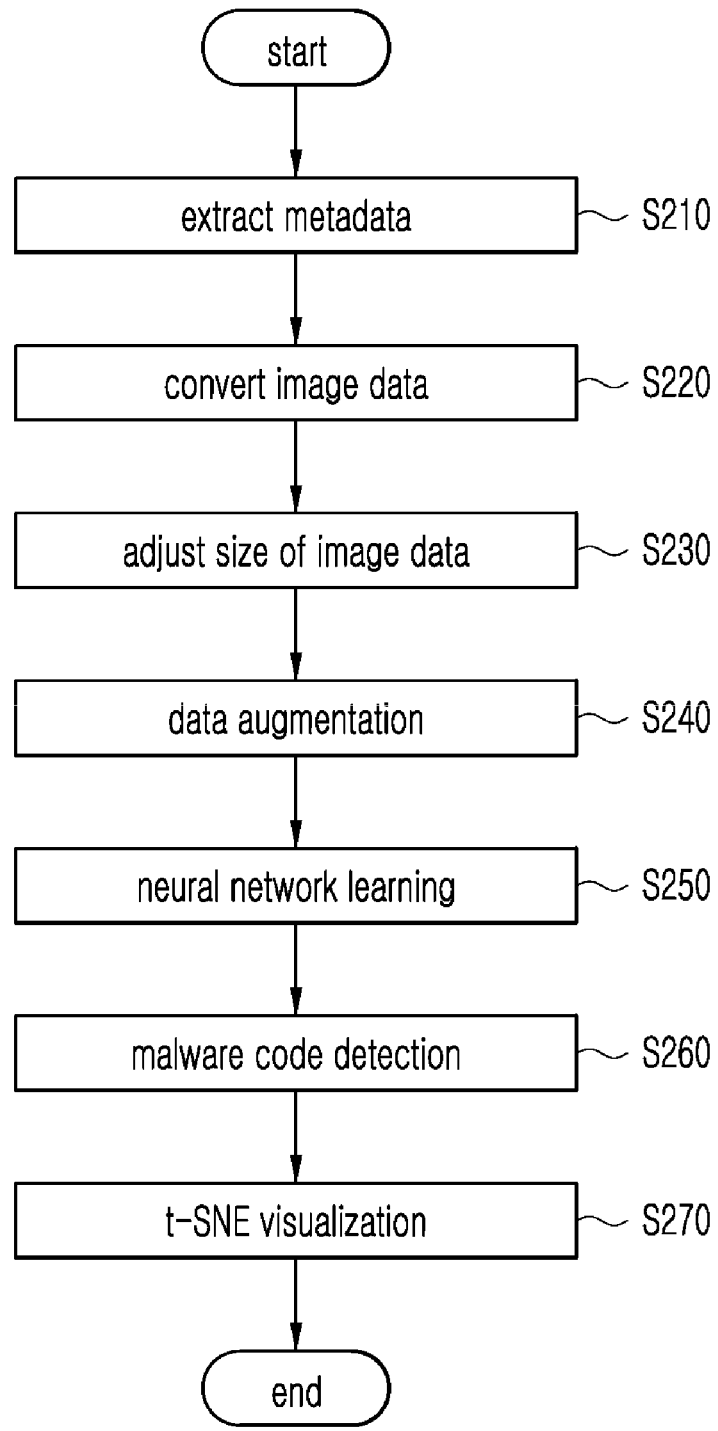
FIG. 10 is a flowchart provided to explain an operation of an AI-based malware detection system according to an embodiment of the present disclosure.

While it is difficult to visually distinguish the classes using malware grayscale image data because the features are spread globally, the classes can be clearly distinguished visually using malware spectrogram image data. FIG. 10 is a flowchart provided to explain an operation of an AI-based malware detection system according to an embodiment of the present disclosure.

Referring to FIGS. 1 and 10, first, the AI-based malware detection system according to the present disclosure may train neural networks on training data that includes malware binary data to classify and recognize malware.

To this end, when the metadata extraction unit (110) receives the target training malware binary data, the metadata extraction unit (110) may extract appropriate metadata (S210).

Next, the data converter 120 may convert the extracted metadata into image data (S220).

At S220, the data converter 120 may convert the extracted metadata into gray scale image data. In addition, the data converter 120 may attach an audio header to the extracted metadata to generate an audio file, and may convert the generated audio file into spectrogram image data. Of course, depending on embodiments, the data converter 120 may convert the extracted metadata into only gray scale image data or spectrogram image data.

Next, the resizing unit 130 may adjust the image data converted at S220 to a size suitable for training the neural network unit 150 (e.g., to a predetermined size such as 256*256 pixels), as necessary (S230). Of course, when the image data is generated in the size suitable for training the neural network unit 150 at S220, the operation at S230 may be omitted.

Next, the data augmentation unit 140 may perform data augmentation with respect to the converted image data (S240).

Figure 11:
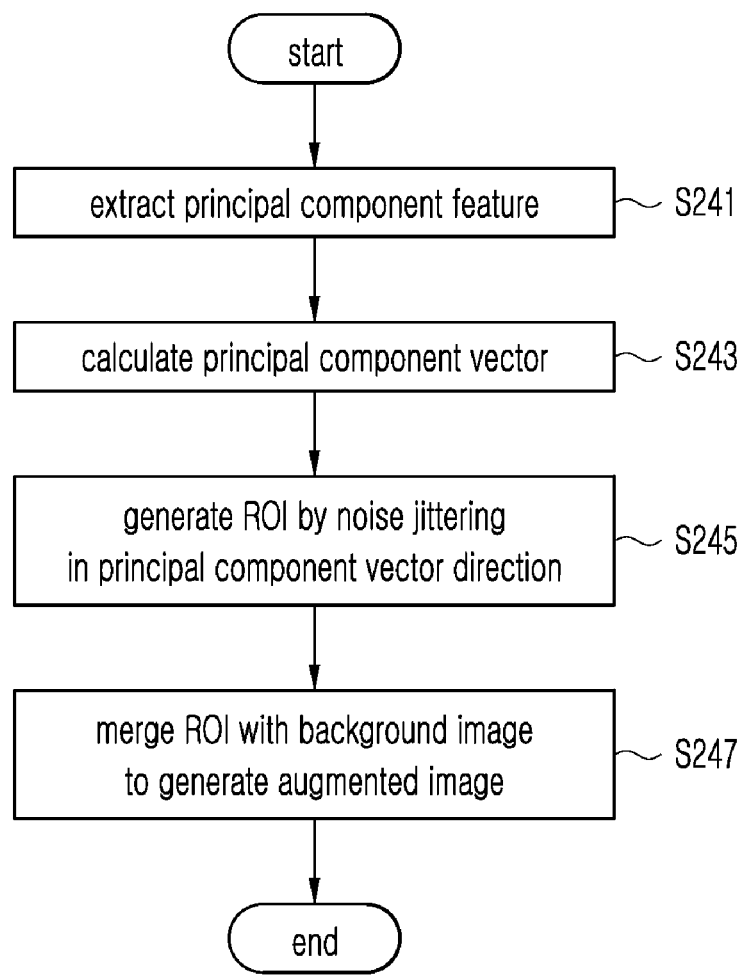
FIG. 11 is a flowchart provided to explain the data augmentation step of FIG. 10 in more detail.

Referring to FIG. 11, the operation at S240 will be described in more detail.

FIG. 11 is a flowchart provided to explain the data augmentation step of FIG. 10 in more detail.

First, the data augmentation unit 140 may apply Principal Component Analysis (PCA) to the converted image data to extract a principal component feature in a malware feature space (S241).

Next, the data augmentation unit 140 may calculate a principal component vector in the feature space with respect to the converted image data (S243), and generate a modified region of interest through noise jittering in the calculated principal component vector direction (S245). Next, the data augmentation unit 140 may generate augmented image data by merging the generated region of interest with a background image of the converted image data (S247).

Referring to FIG. 10, the neural network unit 150 may receive the image data augmented by the data augmentation unit 140 as training data to learn the malware (S250). To this end, the neural network unit 150 may utilize neural network algorithms and apply various deep learning techniques, such as inception module-based Convolutional Neural networks (CNN) with good performance in image recognition, Deep Neural Networks (DNN), Recurrent Neural Network (RNN), restricted Boltzmann machine, Deep Belief Network (DBN), Deep Q-Network, and the like.

In particular, at S250, the neural network unit 150 may perform ensemble training in which the first neural network 151 and the second neural network 153 are individually trained with respect to gray scale image data and spectrogram image data, respectively. After the individual training is completed, the neural network unit 150 may apply different weights W_1 and W_2 to the outputs of the first neural network 151 and the second neural network 153, respectively, to calculate the final output.

Thereafter, when malware binary data is detected by the trained neural network unit 150 (S260), the visualization unit 160 may calculate and visualize two-dimensional and three-dimensional t-SNE plots by using a t-SNE algorithm, on features of malware binary data extracted through the trained neural network unit (S270).

Embodiments of the present disclosure include a computer-readable medium that includes program instructions for performing various computer-implemented operations. The medium records a program for executing the AI-based malware detection method described above. The medium may include program instructions, data files, data structures, etc., alone or in combination. Examples of such medium include a magnetic medium such as hard disk, floppy disk and magnetic tape, an optical recording medium such as CD and DVD, a floptical disk and a magneto-optical medium, a hardware device configured to store and execute program instructions, such as ROM, RAM, flash memory, etc. In addition, such medium may be a transmission medium, such as optical or metal lines, waveguides, etc., that includes carrier wave that transmits a signal specifying program instructions, data structure, or the like. Examples of the program instructions include machine language codes such as those generated by a compiler, as well as high-level language codes that may be executed by a computer using an interpreter, and so on.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An AI-based malware detection method comprising:
    inputting malware binary data;
    extracting metadata from the inputted malware binary data;
    converting the extracted metadata into image data; and
    training a neural network unit on the converted image data to detect malware,
    wherein the converting of the extracted metadata into image data comprises:
        converting the extracted metadata into gray scale image data;
        converting the extracted metadata into an audio file; and
        converting the converted audio file into spectrogram image data.

2. The AI-based malware detection method according to claim 1, further comprising adjusting the converted image data to a predetermined size.

3. The AI-based malware detection method according to claim 1, wherein training a first neural network using the gray scale image data and training a second neural network using the spectrogram image data are performed separately.

4. The AI-based malware detection method according to claim 1, further comprising generating augmented image data by performing data augmentation with respect to the converted image data.

5. The AI-based malware detection method according to claim 1, further comprising visualizing features of the malware binary data extracted through the trained neural network unit by applying a t-SNE algorithm.

6. The AI-based malware detection method according to claim 1, wherein the neural network unit comprises Convolutional Neural Networks.

7. The AI-based malware detection method according to claim 4, wherein the generating of the augmented image data comprises:
   extracting a principal component feature in a malware feature space by applying Principal Component Analysis (PCA) on the converted image data;
   calculating a principal component vector in the malware feature space with respect to the converted image data;
   generating a modified region of interest through noise jittering in the calculated principal component vector; and
   generating the augmented image data by merging the generated modified region of interest with a background image of the converted image data.

8. The AI-based malware detection method according to claim 7, wherein neural networks are trained to detect malware on the augmented image data.

9. An AI-based malware detection system, comprising:
   a metadata extraction unit configured to be inputted with malware binary data and extract metadata from the inputted malware binary data;
   a data converter configured to convert the extracted metadata into image data; and
   a neural network unit configured to perform malware learning using the converted image data,
   wherein the data converter comprises:
      a first image generator that converts the extracted metadata into gray scale image data;
      an audio file generator that converts the extracted metadata into an audio file; and
      a second image generator that converts the converted audio file into spectrogram image data, and
   wherein the metadata extraction unit, the data converter, and the neural network unit are each implemented via at least one processor.

10. The AI-based malware detection system according to claim 9, further comprising a resizing unit configured to adjust the converted image data to a predetermined size,
   wherein the resizing unit is implemented via at least one processor.

11. The AI-based malware detection system according to claim 9, wherein the neural network unit comprises:
   a first neural network that performs malware learning using the gray scale image data; and
   a second neural network that performs malware learning using the spectrogram image data.

12. The AI-based malware detection system according to claim 9, further comprising a data augmentation unit configured to generate augmented image data by performing data augmentation with respect to the converted image data,
   wherein the data augmentation unit is implemented via at least one processor.

13. The AI-based malware detection system according to claim 9, wherein the neural network unit comprises convolutional neural networks.

14. The AI-based malware detection system according to claim 12, wherein the data augmentation unit is further configured to:
   extract a principal component feature in a malware feature space by applying Principal Component Analysis (PCA) on the converted image data;
   calculate a principal component vector in the feature space with respect to the converted image data;
   generate a modified region of interest through noise jittering in the calculated principal component vector direction; and
   generate the augmented image data by merging the modified generated region of interest with a background image of the converted image data.

15. The AI-based malware detection system according to claim 14, wherein the neural network unit is trained on malware data including the augmented image data.

16. The AI-based malware detection system according to claim 15, further comprising a visualization unit configured to visualize features of the malware binary data extracted through the trained neural network unit by applying a t-SNE algorithm,
   wherein the visualization unit is implemented via at least one processor.

* * * * *